Aug. 13, 1935. W. G. McMURRAY Re. 19,666

METHOD OF AND APPARATUS FOR THE SEPARATION OF OIL, GAS AND WATER

Original Filed July 28, 1932

William G. McMurray
INVENTOR

BY Ernest G. Hood
ATTORNEY

Reissued Aug. 13, 1935

Re. 19,666

UNITED STATES PATENT OFFICE 19,666

METHOD OF AND APPARATUS FOR THE SEPARATION OF OIL, GAS, AND WATER

William Granville McMurray, Wichita Falls, Tex., assignor to M & V Tank Company, Wichita Falls, Tex.

Original No. 1,946,229, dated February 6, 1934, Serial No. 625,358, July 28, 1932. Application for reissue February 24, 1934, Serial No. 712,856

12 Claims. (Cl. 196—5)

This invention relates to the method of and apparatus for the separation of oil, gas, and water, such constituting the production of an oil well and the invention has particular reference to a heater for fluid separator tanks of the character specified.

The principal object of the invention is to provide a heater for reducing the solids to liquids and minimizing the viscosity of crude oil and expediting the separation of water and oil, whereby the latter may seek its level in the separator tank to a point where it is drawn off.

Another object of the invention is to provide means for utilizing the surplus gaseous element entering with the fluid as a fuel to obtain a heating agent to raise the temperature of the contents of the tank at the point of discharge thereof into the tank, which heated temperature is maintained at the desired degree to liquefy the paraffin and asphalt base or any other foreign element of the crude oil and allow the same to seek its level above that of the water content of the tank where it may be conveniently withdrawn through suitable pipes provided for the purpose.

Still another object of the invention resides in the apparent safety of the improved heater, in that fire hazards are positively eliminated by the complete separation of the actual flame from the fluid and through the medium of a remotely situated gas outlet.

Yet another object of the invention is to provide, in a separator tank of the character specified, a chamber for transmitting heat through the medium of steam, hot liquids or the combustion of gas, combined with thermostatically controlled valves, which lends an automatic feature to enable the invention to be operated without requiring a great amount of manual attendance.

The invention further comprehends the provision of automatic float regulators and through the medium of which the water and oil levels in the tank are predetermined. Also, by reason of this provision, cold water entering the tank with the oil may be expelled to thereby eliminate the necessity of heating the same, which feature makes for economy of operation and ready separation.

The invention seeks further to provide in a separator tank of the character specified, a novel means of breaking up the fluids entering the tank, thereby to more effectively break up the fluids as they are introduced into the tank in a ball like form clinging together, and when seeking its level passing through the perforated baffles are broken up into small particles which allows the crude to rise free of water. The gases are thus released to find their way out of the tank through suitable valves and vents in the top thereof.

Another object of the invention is the provision of an improved method of separating oil, gas and water from an emulsion constituting the production of an oil well.

With the foregoing objects as paramount, the invention has particular reference to its salient features of construction and arrangement of parts to perform the function for which it is intended and which will become manifest as the description proceeds, taken in connection with the accompanying drawing, wherein—

Figure 1:
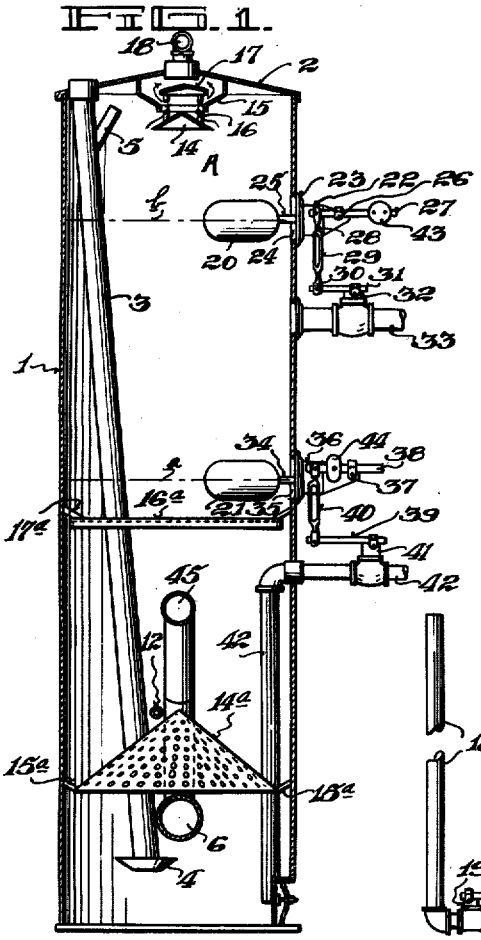
Figure 1 is an elevational view of the invention in vertical section, showing the conductor pipe combustion chamber float valve regulators and baffles.

Continuing more in detail with the drawing, 1 designates an upright fluid separator tank and is provided with a dome 2. A conductor pipe 3 is disposed in the tank 1, preferably in a slightly inclined position, as shown in Figure 1 and extends through the dome 2. Fluid, which includes water and oil enters the tank through the pipe 3 and impinges the inverted frusto-conical shaped baffle 4 disposed upon the lower end of the pipe 3. The purpose of the baffle 4 will be described in greater detail presently.

Figure 2:
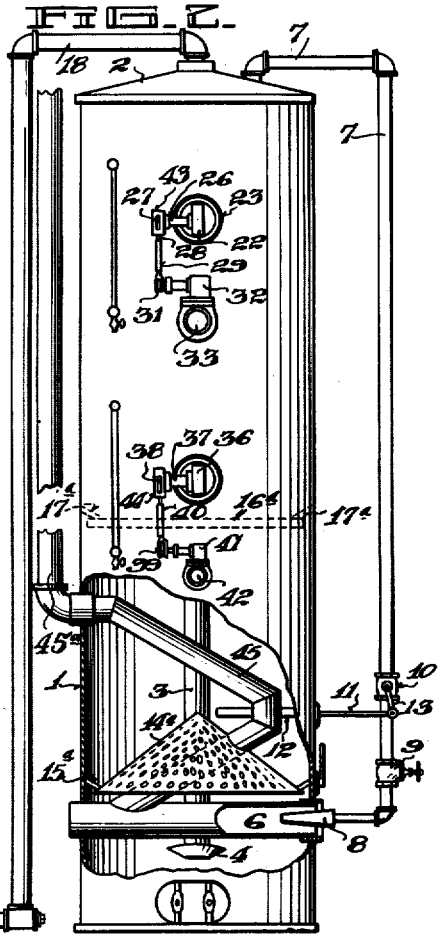
Figure 2 is a side elevation with portions broken away to show the combustion chamber baffle and one method of generating heat.

It will be understood that the entire mixture of gas, water and oil, from wells situated adjacent to the tank 1 enters the latter through the pipe 3 indiscriminately and a part of the gas is separated from the fluid and passes out of the pipe 3 through the vent 5 near the top of the tank. This gas, together with that which follows the fluid and eventually accumulates in the upper part of the tank creates a pressure in that part of the tank designated at A, and which pressure is an effective aid in securing separation of the oil and water. In some instances this gas is utilized for creating the necessary heat in the combustion chamber 6, to which reference will be later made. A pipe 7 enters the dome 2 of the tank 1 and extends downwardly alongside the tank and upon its lower end is mounted a gas burner 8, which extends into the combustion chamber 6. Immediately above the lower end of the pipe 7 is a cut-off valve 9 and spaced from this valve is a control valve 10, as apparent in Figure 2 and which latter valve is automatically controlled through the medium of a thermo-expansive rod 11, situated in a tubular housing 12, extended into the tank in the manner shown in Figure 2.

It is apparent from the foregoing that the oil stock is conducted through the upright separating chamber in a direction counter to the normal separating action and is discharged into the separating chamber or tank adjacent its bottom below the level of the heating element or furnace, the latter being positioned below the normal line of separation of the oil and water.

The exterior end of the rod 11 actuates the valve 10 by reason of its connection to a lever 13. When the fluid within the tank 1 is heated to a predetermined degree, expansion of the rod 11 will actuate the valve 10 to close or partially close the same but under adverse conditions, contraction of the rod will cause the valve to be opened to allow a great amount of gas to be fed to the burner 8, thereby increasing the temperature of the fluid.

Surplus gas in the upper portion A of the tank 1 is baffled out through the arrangement shown in the upper portion of Figure 1, comprised of the baffle plate 14, which is suspended from the trap 15 by means of depending arms 16. A similar baffle 17 is disposed within the trap 15 and so supported as to permit the escape of gases accumulated in the trap 15, as shown by the arrows. In so causing the gas to pass out of the tank into the pipe 18, separation of the entrained vapors from the fluid will result and the waste gases which are substantially dry are passed off through the pipe 18, conveyed to a remote point and ignited after they pass through the relief valve 19. It is understood, however, that the superfluous gas content of the tank is discharged through the pipe 18 and may be utilized for any commercial purpose to which it may be applied.

As stated previously, the mixture enters the tank 1 through the conductor pipe 3 and the lighter fluids seek their level above the water level designated at *a*. The oil level is designated in Figure 1 at *b* and it will be understood that the levels *a* and *b* are predetermined and definitely maintained through the provision of floats 20 and 21.

It has been found desirable, in order to insure complete separation of the fluids, to provide, in addition to the small baffles 4, a perforated cone shaped baffle 14*a*, whose diameter is somewhat less than the inside diameter of the tank 1. This baffle is suspended by means of straps 15*a* to the walls of the tank and, as apparent in Figure 2, it has an opening therein to accommodate the vent 45 of the combustion chamber 6. It will be observed that the baffle plate or diffuser head 14*a* is located between the level of the heating element 6 and the normal line of separation of the oil and water so that the stock will be constrained to pass therethrough in seeking its level in the tank.

Immediately above the baffle 14*a* is a perforated plate 16*a* which is also smaller in diameter than the inside of the tank 1 and is suspended by means of straps 17*a*. This plate is disposed on a horizontal plane and contains a flange around the entire edge which serves to constrain the fluid and effects better baffling immediately below the water level *a*.

As the fluids rise from their point of discharge in the tank 1, they are forced to pass through the perforations in the cone shaped baffle 14*a* and in so doing, they are separated into streams in which the gases are entrained. More effective disentrainment of the gases results from the thus constrained passage of the fluids and better separation is obtained.

The perforated plate 16*a* merely serves to duplicate the breaking up of the fluids to effect further disentrainment of the gases and even more effective separation.

With particular reference to the floats and their associated elements, it will be noted that a hollow casting 22 is affixed to a flange 23 and which flange is secured about an opening 24 in the wall of the tank 1.

The float 20 is mounted upon a stem 25, which extends into the casting 22 and is affixed to a transverse shaft 26, which protrudes through the side of the casting 22 near its end. An arm 27 is secured to the protruding end of the shaft 26 so as to lie on a plane parallel with the stem 25 which carries the float 20. A link 28 is pivoted to the inner end of the arm 27 and through the medium of a turn buckle 29 and a similar link 30, is connected to an arm 31, which opens and closes a valve 32 to thereby control the flow of oil out of the tank 1 through the pipe 33.

From the foregoing description, it will be noted that when the oil level at *b* rises, the float 20 will also rise and rotate the short shaft 26, thereby rocking the arm 27 to exert an upward pull upon the link 28, turn buckle 29, link 30 and the arm 31, to thereby open the valve 32 and allow the oil to pass out of the tank to a storage reservoir or the like through pipe 33.

Figure 3:
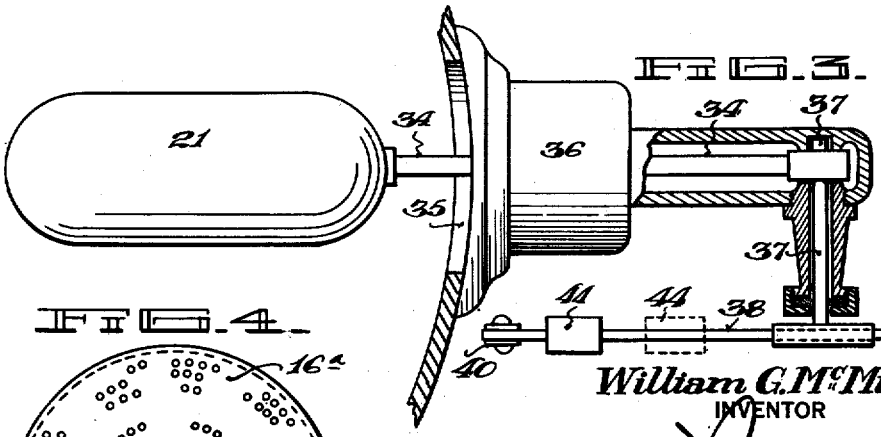
Figure 3 is a plan view in detail of the float valve regulator in which the housing is partially broken away.
Figure 4:
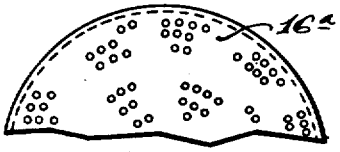
Figure 4 is a fragmentary view of one of the baffles.

The water level at *a* is controlled through the medium of the float 21, which is constructed in a manner similar to the float control just described and has a stem 34, which passes through the opening 35 in the wall of the tank 1 and into the casting 36. The outer end of the stem 34 is rigidly connected to a transverse shaft 37, which may be seen in Figure 3. Vertical movement of the float 21 will actuate the shaft 37 to thereby rock the arm 38 and exert an upward pull upon the arm 39 through the medium of a turn buckle 40. This action opens the valve 41 and allows the water below the line *a* to pass through the pipe 42 out of the tank 1.

There is an apparent difference in the construction of the floats 20 and 21 which is necessary to insure proper operation of the valves 32 and 41. By loading the float 21, it is capable of sinking or rising in oil but floats on water which is the essential characteristic of the float 21, in view of the fact that this float is always between the fluid levels at *a* and must not be affected by the pressure of the oil and gas above this level.

It will be understood that the fluid levels in the tank must vary in accordance with the specific gravity of the fluids being treated and in this connection, it is desirable to provide a suitable control to predetermine the actuation of the valves 32 and 41 to meet any such requirements. Accordingly, a weight 43 is mounted upon the arm 27 of the upper float assembly and a sliding weight 44 is mounted upon the arm 38 of the lower valve assembly, the latter being shown in Figure 3 in adjusted position.

It will be further understood that float 21 is so constructed to operate between the fluid line A so as to be totally immersed in the crude of any predetermined gravity and being of a buoyant nature upon the water which has sought the lower level due to being the heavier fluid, float 21 will require a greater degree of weighting to effect the sinking in higher gravity crudes than that of a lower gravity, the adjustment being accomplished by sliding weight 44 upon arm 38 in moving weight in direction nearer to tank by adding more weight to float 21 which is to govern the actuation in the predetermined gravities and the floating upon lower fluid is differentiated. As water containing a greater amount of salt is heavier than fresh water, weight 44 is set on arm 38 to meet with any condition of the fluids. Entrapped water is released as previously explained.

The combustion chamber 6 is provided with a suitable vent 45 and is of such form that it will carry the heat from the combustion chamber in such manner as to produce maximum results. In other words, reference to Figure 2 will disclose that the pipe 45 extends upwardly and toward one side of the tank 1 while the upper portion of the pipe 45 extends toward the opposite side of the tank. A suitable means in the form of a stack may be provided and connected to the outlet of pipe 45 to direct the hot gases well away from the tank in order to remove the possibility of ignition. In addition to radiating a greater amount of heat, the peculiar shape of the vent 45 minimizes the possibility that flames will pass out the open end thereof. Although a stack such as mentioned in the foregoing will preclude the possibility of a fire.

Again referring to the conductor pipe 3 and the baffle 4 on the lower end thereof, the peculiar function of the conductor pipe 3, which conducts the emulsion through the chamber and substantially throughout the length thereof prior to its final discharge into the chamber, is to effect the preheating of the stock or emulsion as it passes downwardly through the chamber, with the function of the baffle 4 being to diffuse the inflowing fluids and direct them upwardly. The relatively cold water flowing in with the fluid naturally seeks a lower level and is drawn off through the pipe 42 whose open end is arranged below the level at which the emulsion or stock is introduced into the chamber. Thus the relatively cold water is not allowed to remain in the tank a sufficient length of time to become heated to any great extent. In so drawing off the cold water, a great deal of heat energy is conserved and likewise adds to the efficiency in separating the constituents.

It is of course desirable, in some cases to employ gas entrapped in the separator as a fuel as explained but it will be understood that gas may be transported from an adjacent source if found necessary or desirable. It is also obvious that steam or hot water may be injected by connecting into the open end of the vent 45 and passing the same therethrough counter-current with the fluid rising in the tank 1. Of course, when this method of heating is employed, the gas burner 8 is removed from the mouth of the combusion chamber 6.

Manifestly, the construction shown and described is capable of some modification and such modification as is considered within the scope and meaning of the appended claims is also considered within the spirit and intention of the invention.

What is claimed is:

1. The method of separating oil, gas and water in a continuous operation in an upright chamber consisting in the steps of applying heat to the stock or mixture contained in the chamber at a point above the bottom of the chamber, of conducting the stock or mixture through the chamber in a direction counter to the normal separating action therein, of delivering the so conducted stock or mixture into the chamber and to the zone thereof below the point of heat application, of diffusing and retarding the normal upward movement of the latter elements in their passage through the heated liquid and above the zone of heat introduction, and finally of drawing off the separated water content of the stock or mixture from a level of the chamber below the zone of delivery of the stock or mixture to the chamber and of drawing off the oil and gas elements of the stock or mixture from their respective zones or elevations after separation has occurred.

2. The method of separating oil, gas and water in a continuous operation in an upright pressure chamber consisting in the steps of applying heat to the stock or mixture contained in the chamber at a point above the bottom of the chamber, of conducting the stock or mixture through the chamber in a direction counter to the normal separating action therein, of delivering the so conducted stock or mixture into the chamber and to the zone thereof below the point of heat application, of diffusing and retarding the normal upward movement of the latter elements in their passage through the heated liquid and above the zone of heat introduction, and finally of drawing off the separated water content of the stock or mixture from a level of the chamber below the zone of delivery of the stock or mixture to the chamber and of drawing off the oil and gas elements of the stock or mixture from their respective zones or elevations after separation has occurred.

3. The method of separating oil, gas and water in a continuous operation in an upright chamber consisting in the steps of applying heat to the stock or mixture contained in the chamber at a point above the bottom of the chamber, of conducting the stock or mixture through the chamber in a direction counter to the normal separating action therein, of delivering the so conducted stock or mixture into the chamber and to the zone thereof below the normal line of separation of the oil and water, of retarding the normal upward movement of the stock or mixture at a point above the zone of application of said heat, and finally of drawing off the separated water content to the stock or mixture from a level of the chamber below the zone of delivery of the stock or mixture to the chamber and of drawing off the oil and gas elements of the stock or mixture from their respective zones.

4. The method of separating oil, gas and water in a continuous operation in an upright pressure chamber consisting in the steps of applying heat to the stock or mixture contained in the chamber at a point above the bottom of the chamber, of conducting the stock or mixture through the chamber in a direction counter to the normal separating action therein, of delivering the so conducted stock or mixture into the chamber and to the zone thereof below the normal line of separation of the oil and water, of diffusing and retarding the normal upward movement of the latter elements in their passage through the heated liquid and above the zone of heat introduction, and finally of drawing off the separated water content of the stock or mixture from a level of the chamber below the zone of delivery of the stock or mixture to the chamber and of drawing off the oil and gas elements of the stock or mixture from their respective zones or elevations after separation has occurred.

5. In an apparatus for separating water, oil and gas from a mixture thereof, an upright separation chamber, means for conducting the mixture through the chamber and in a direction counter to the normal separating action therein, means for delivering the mixture adjacent the bottom of the chamber, means for applying heat to the contents of the chamber and above the point of introduction of the mixture, and means located above the point of application of the heating means for diffusing the mixture and retarding the normal upward travel of the oil and gas, said diffusing and retarding means being located below the normal line of separation of the water and oil, and means for withdrawing the separated elements from the zones assumed thereby after separation has occurred.

6. In apparatus for separating water, oil and gas from a mixture thereof, an upright separation chamber, means for conducting the mixture through the chamber and in a direction counter to the normal separating action therein, means for delivering the mixture into the chamber adjacent the bottom thereof, means for applying heat to the contents of the chamber, said heating means being located intermediate the point of introduction of the mixture and the normal line of separation of the water and oil, means for diffusing the mixture and retarding the normal upward travel of the oil and gas, said last means being located intermediate the heating means and said normal line of separation of the water and oil, means for withdrawing the separated water content of the mixture from the chamber and from a level thereof below the mixture delivering means, and means for withdrawing the separated oil and gas elements of the mixture from the zones assumed thereby after separation has occurred.

7. Apparatus of the heater type for the separation of water in oil emulsions including an upright tank in which the oil and water seek their respective levels, a combustion chamber disposed wholly within the confines of the lower portion of said tank and below the water level therein, a flue communicating with and extending upward from said chamber also within said tank and discharging at the side of said tank, an inverted cone shaped and perforated baffle disposed above said chamber and embracing said flue and through which the liquid entering said tank is constrained to pass upward, a second perforated baffle above said flue and means for heating said chamber.

8. Apparatus of the heater type for the removal of water from roily oil including a self-contained upright tank and combustion chamber therein in which tank the oil and water seek their respective levels, the combustion chamber extending diametrically across the lower portion of said tank below the water level therein, a flue communicating with and extending angularly upward from said chamber also wholly within the confines of said tank, means for supplying a combustible medium to said combustion chamber, and means for automatically controlling the supply of said combustible medium.

9. An upright tank for the separation of water and oil emulsions including a combustion furnace chamber disposed wholly within said tank, an emulsion conducting pipe extending substantially through said tank and terminating in a discharge outlet below said furnace chamber, a hot air flue communicating with and extending angularly upward from said furnace chamber and means disposed above said furnace chamber through which said liquid is constrained to ascend for breaking up the emulsion, thereby causing more intimate contact thereof with said furnace chamber and flue.

10. Apparatus of the heater type for the separation of water in oil emulsions including a tank in which the oil and water seek their respective levels, a combustion chamber disposed wholly within the confines of the lower portion of said tank below the water level therein, a flue communicating with and extending angularly upward from said chamber also within said tank and discharging at the side of said tank, an inverted cone shaped and perforated baffle disposed above said chamber and embracing said flue and through which the liquid entering said tank is constrained to pass upward, a second perforated baffle above said flue, means for transporting gases emanating from the oil in said tank to a point adjacent the opening of said combustion chamber, a nozzle for discharging said gas into the open end of said chamber for ignition and thermostatic means for controlling the flow of gas through said transporting means.

11. Apparatus of the heater type for the removal of water from roily oil including a tank in which the oil and water seek their respective levels, a combustion chamber extending diametrically across the lower portion of said tank below the water level therein, a pipe communicating with the tank above the oil level therein and carrying a nozzle for directing gas emanating from said oil into said chamber for ignition, a flue communicating with and extending angularly upward from said chamber also wholly within the confines of said tank, means for automatically controlling the passage of gas through said pipe.

12. A tank for the separation of water and oil emulsions including a combustion furnace chamber disposed wholly within said tank, using as a fuel the gas emanating from the oil content of said tank, a liquid inlet for said tank terminating in a discharge below said furnace chamber, a hot air flue communicating with and extending angularly upward from said furnace chamber, means disposed above said furnace chamber through which said liquid is constrained to ascend for breaking up the emulsion, causing more intimate contact thereof with said furnace chamber and flue, means for transporting the gaseous constituent of said tank to a point to be discharged into said furnace chamber for ignition and means for automatically controlling the flow of said gas through said transporting means.

WILLIAM GRANVILLE McMURRAY.